(12) United States Patent
Bernstein et al.

(10) Patent No.: US 9,317,182 B2
(45) Date of Patent: Apr. 19, 2016

(54) POP-UP MENU INTERFACE

(71) Applicant: APPLE INC., Cupertino, CA (US)

(72) Inventors: Mark Bernstein, San Francisco, CA (US); Matthew R. Lehrian, Pittsburgh, PA (US); Ryan M. Olshavsky, San Jose, CA (US); Yik Shing Yip, Fremont, CA (US); Christopher Douglas Weeldreyer, San Carlos, CA (US); Jane H. Chronis, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 248 days.

(21) Appl. No.: 13/860,939

(22) Filed: Apr. 11, 2013

(65) Prior Publication Data

US 2014/0310649 A1    Oct. 16, 2014

(51) Int. Cl.
    *G06F 3/00*     (2006.01)
    *G06F 3/048*    (2013.01)
    *G06F 3/0482*   (2013.01)
    *G06F 17/24*    (2006.01)

(52) U.S. Cl.
    CPC ............ *G06F 3/0482* (2013.01); *G06F 17/246* (2013.01)

(58) Field of Classification Search
    None
    See application file for complete search history.

(56) References Cited

U.S. PATENT DOCUMENTS

| | | | |
|---|---|---|---|
| 5,339,392 A * | 8/1994 | Risberg et al. | 715/762 |
| 5,664,133 A * | 9/1997 | Malamud et al. | 715/816 |
| 5,685,001 A | 11/1997 | Capson et al. | |
| 5,805,167 A * | 9/1998 | van Cruyningen | 715/808 |
| 6,430,584 B1 * | 8/2002 | Comer et al. | 715/212 |
| 7,472,339 B2 * | 12/2008 | Bauchot | 715/214 |
| 7,519,585 B2 * | 4/2009 | Kenney et al. | 1/1 |
| 7,600,197 B2 * | 10/2009 | Gourdol et al. | 715/817 |
| 7,792,814 B2 * | 9/2010 | Cohen | 707/707 |
| 7,913,185 B1 * | 3/2011 | Benson et al. | 715/808 |
| 8,656,271 B2 * | 2/2014 | Vayssiere et al. | 715/219 |
| 2002/0059233 A1 * | 5/2002 | Bauchot et al. | 707/7 |
| 2003/0011638 A1 * | 1/2003 | Chung | 345/808 |
| 2004/0053605 A1 * | 3/2004 | Martyn et al. | 455/418 |
| 2004/0205526 A1 | 10/2004 | Borodovski et al. | |
| 2005/0210369 A1 | 9/2005 | Damm, Jr. | |
| 2006/0074879 A1 * | 4/2006 | Covington et al. | 707/3 |
| 2006/0101013 A1 * | 5/2006 | Kenney et al. | 707/4 |
| 2007/0078872 A1 * | 4/2007 | Cohen | 707/101 |
| 2009/0037803 A1 * | 2/2009 | Bauchot | 715/214 |
| 2009/0044095 A1 | 2/2009 | Berger et al. | |
| 2012/0174031 A1 * | 7/2012 | Dondurur et al. | 715/808 |
| 2012/0198322 A1 | 8/2012 | Gulwani et al. | |
| 2014/0237339 A1 * | 8/2014 | Chamberlain et al. | 715/217 |

* cited by examiner

*Primary Examiner* — Yongjia Pan

(74) *Attorney, Agent, or Firm* — Fletcher Yoder PC

(57) ABSTRACT

Approaches are disclosed for generating a menu that may be used to provide a set of bounded options for populating associated cells of a table. In certain embodiments, the menu is automatically generated based at least in part on the initial content of one or more cells to be associated with the menu. In certain embodiments, the options listed in the menu may be edited by a user or reformatted based on logic associated with the menu generation process.

24 Claims, 9 Drawing Sheets

POP-UP MENU INTERFACE

BACKGROUND

The present disclosure relates generally to the use of a pop-up menu interface in populating cells of a table.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain productivity applications, a user may be prompted to provide inputs or otherwise fill in content of a cell or series of cells within a table. For example, in a spreadsheet application or other application where a table is provided, certain of the cells may be used to display user selected or input content. In some instances, it may be appropriate for a range of cells, such as a row or column, to contain values selected from a known or limited set of values. That is, the value for a given cell may correspond to a value from a known set or list of possible values. Implementation of a user-friendly approach for helping a user populate such cells, particularly in the context of a portable or handheld device where the input control structures are limited, may be difficult.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with various implementations discussed herein, the generation and use of pop-up menus for populating cells of a table is described. In certain embodiments, the cells and table are displayed as part of a productivity application (such as a spreadsheet application) running on a portable or handheld device having a limited range of input structures, such as only having a touch screen or a touch-screen and one or two function buttons. In certain implementations, a user may automatically generate a pop-up menu for use in specifying content of associated cells. In particular, the pop-up menu may be automatically and dynamically generated when a user selects a set of populated cells for association with the pop-up menu. For example, the contents of the selected cells may be used to populate a list of options or items in a pop-up menu, with duplicated values or contents only being added a single time to the pop-up menu list of options. In addition, automatic reformatting (such as to identifiable text, date, time, or numeric formats) of the cells contents may be performed as part of the pop-up menu generation. A user may also perform manual editing of the generated pop-up menu, with the corresponding values in the selected cells subsequently being reformatted or altered based on the automated reformatting or user provided edits applied to the pop-up menu options. Otherwise, however, the contents of the cells used to generate the pop-up menu list of options is unchanged as long as that value is present in the associated pop-up menu.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, certain types of applications (such as productivity applications running on processor-based system) may provide a user with the option to place a table within a document (i.e., a word processing document, a spreadsheet, a slide of a presentation application, and so forth). Such tables typically consist of cells, in which the user can enter content (i.e., numbers, letters, words, and so forth). In certain instances, the content added to a range of cells (e.g., all or part of a column or row of cells) may have a limited range of defined or pre-defined values, i.e., the data entry options may be bounded. For example a range of cells may be defined as corresponding to some qualitative characteristic (such as color, flavor, diagnosis, part type, rating, true/false, yes/no) for which there may be a limited number of defined or pre-defined values. Alternatively, the range of cells may be defined as corresponding to a quantitative characteristic for which the values are limited and definable (e.g., such as a column corresponding to height in feet, where another column may contain the value in inches which may be more continuous in nature).

In accordance with certain implementations of the present disclosure, a pop-up menu may be generated, edited, and used in filling in content of cells having such a limited range of content options. By way of example, and as discussed herein, selecting a cell associated with a pop-up menu control function (such as by single- or double-tapping a table cell in a touch-screen display context) causes the control associated with that cell to be displayed. In the case of a pop-up menu, the associated control is a list of values that are displayed, allowing the user to select the appropriate value from the list. The selected value may then be inserted into the respective cell and the pop-up menu may be hidden until invoked again. In certain implementations, as discussed herein, the pop-up menu may be manually created by the user or may be automatically generated based upon values already present in a range of cells specified by the user.

Figure 1:
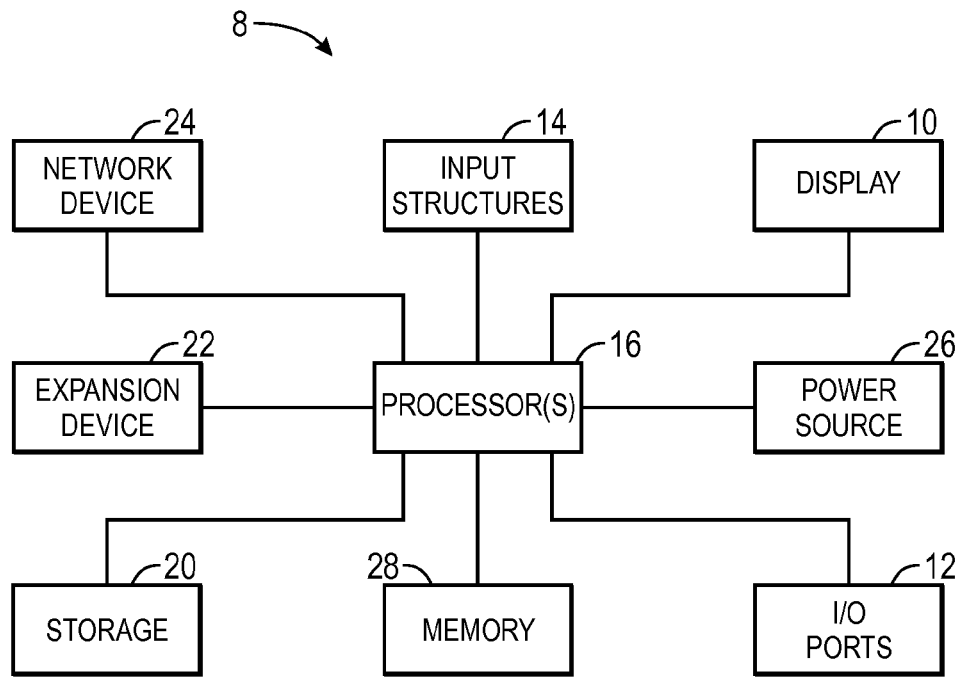
FIG. 1 is a block diagram of components of an example of an electronic device, in accordance with aspects of the present disclosure.
Figure 3:
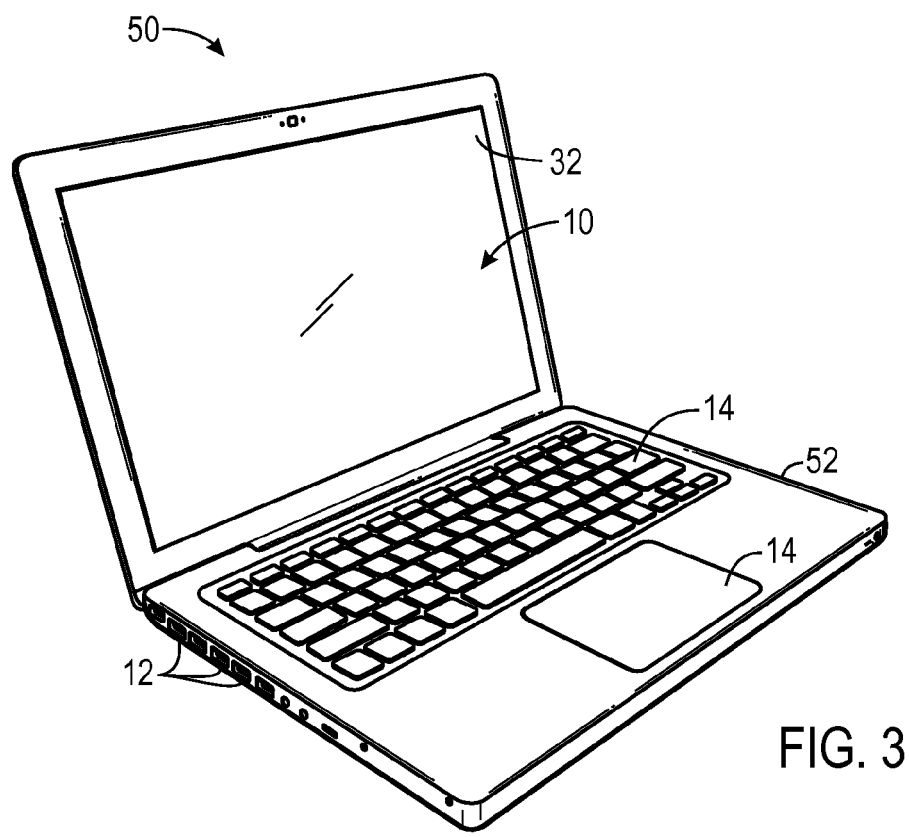
FIG. 3 is a perspective view of an example of a laptop electronic device, in accordance with aspects of the present disclosure.
Figure 2:
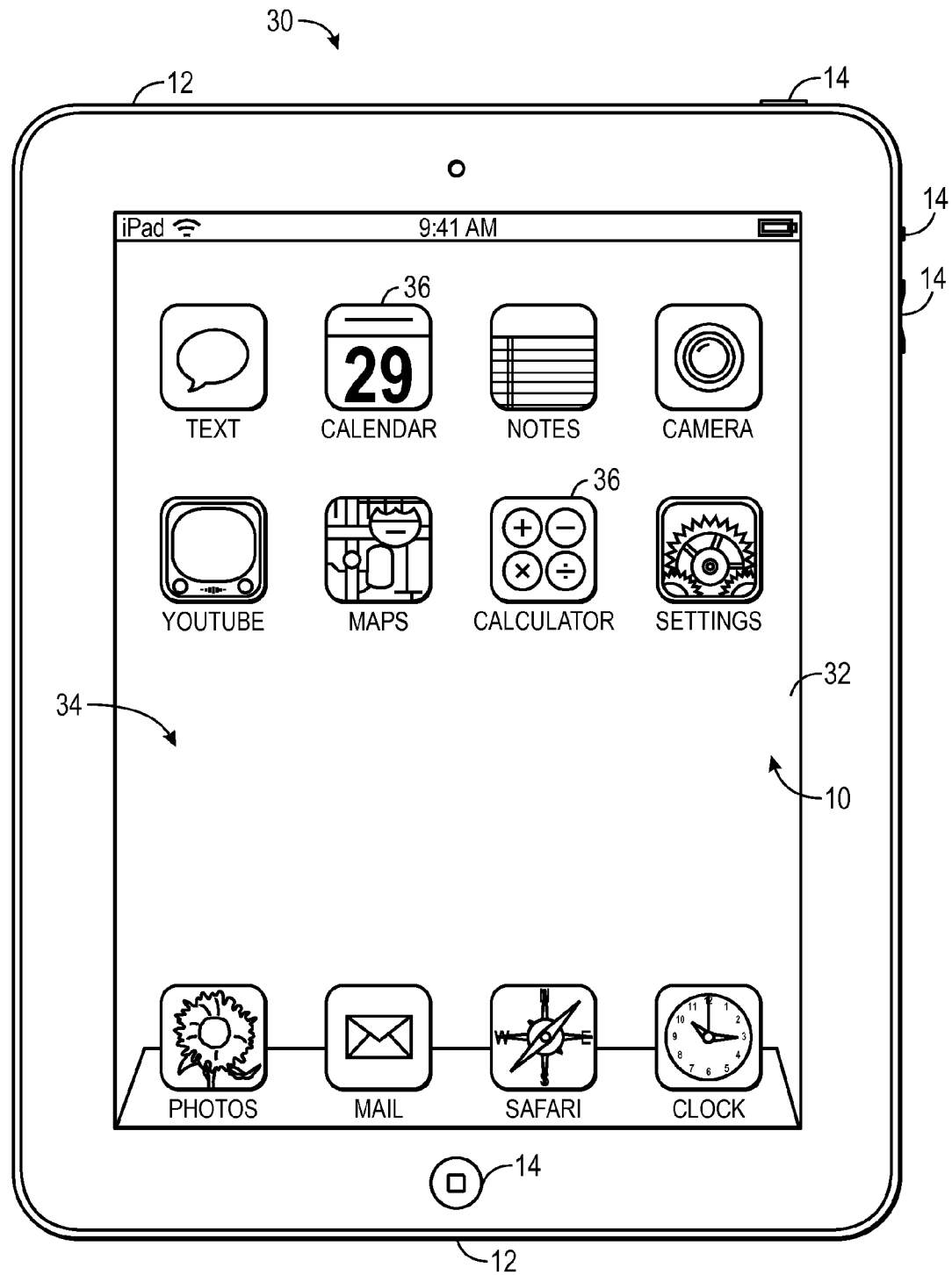
FIG. 2 is a perspective view of an example of a handheld electronic device, in accordance with aspects of the present disclosure.

With the foregoing in mind, a general description is provided below of suitable electronic devices that may be used in the implementation of the present approaches to generation and use of pop-up menus. In particular, FIG. 1 is a block diagram depicting various components that may be present in an electronic device suitable for running an application that allows for the display of tables and the generation and use of pop-up menus in conjunction with such tables. FIGS. 2 and 3 respectively illustrate perspective and front views of suitable electronic devices, which may be, as illustrated, a handheld electronic device (e.g., a tablet computer) or other mobile computing device (e.g., a laptop computer).

An example of an electronic device suitable for the techniques described herein may include various internal and/or external components. For example, FIG. 1 is a block diagram illustrating the components that may be present in such an electronic device 8, allowing the electronic device 8 to function. One of ordinary skill in the art will appreciate that the various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be an LCD, OLED-type display, or other suitable display device. Additionally, in certain embodiments of the electronic device 8, the display 10 may be provided in conjunction with a touch-sensitive element, such as a touchscreen, that may be used as part of the control interface for the device 8 and, further, may be used in conjunction with the presently disclosed approach to enter content into cells of a table or to rotate content entered into cells of a table displayed on the touchscreen.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 or Firewire™ port, a Thunderbolt™ port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touchscreen, where a touch sensitive mechanism is provided in conjunction with the display 10. In such embodiments, the user may select or interact with displayed interface elements (such as column or row elements of a displayed table) via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces (e.g., a word processor, spreadsheet, database, or presentation application user interface), and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more central processing units (CPUs), physics processors, graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard; any 2G, 3G, or 4G cellular data standard; or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter and suitable connector port. This power adapter may also be used to recharge one or more batteries, if present.

With the foregoing in mind, FIG. 2 illustrates an electronic device 8 in the form of a handheld device 30, here a tablet computer. By way of example, the handheld device 30 may be a model of an iPad®, iPod®, or iPhone® available from Apple Inc. of Cupertino, Calif. It should be noted that while the depicted handheld device 30 is provided in the context of a tablet computer, other types of handheld devices (such as media players for playing music and/or video, personal data organizers, handheld game platforms, e-readers, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, an e-reader, a personal data organizer, and so forth.

For example, in the depicted embodiment, the handheld device 30 is in the form of a tablet computer that may provide various functionalities (such as the ability to take pictures, record audio and/or video, listen to music, play games, map travel routes, and so forth) in addition to running applications, such as productivity software, capable of displaying and manipulating content within table cells. As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a tablet computer implementation, one or more of the input structures 14 may be configured to invoke a "home" screen or menu to be displayed, to toggle between a sleep and a wake mode, adjust the volume of audible feedback, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a mouse, wheel, or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted tablet computer of FIG. 2, an electronic device 8 may also take the form of a computer or other type of electronic device. Such computers may include computers that are generally portable (such as laptop or notebook computers) as well as computers that are generally used in one place (such as conventional desktop computers, workstations and/or servers).

In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3, in accordance with one embodiment of the present disclosure. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard, mouse, and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port, Thunderbolt® port, or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications (e.g., productivity and/or presentation applications having a user interface).

With the foregoing discussion in mind, an electronic device 8, such as either a handheld electronic device 30 or computer 50, may be used to store and run an application that allows a user to generate, modify, and utilize a pop-up menu containing options for populating a cell of a table. In certain implementations, routines executed on the electronic device 8 may initially automatically generate or populate such a pop-up menu and a user may subsequently edit and use the pop-up menu when entering data into cells of a table. In other embodiments, the user may generate the pop-up menu themselves for subsequent use.

Figure 4:
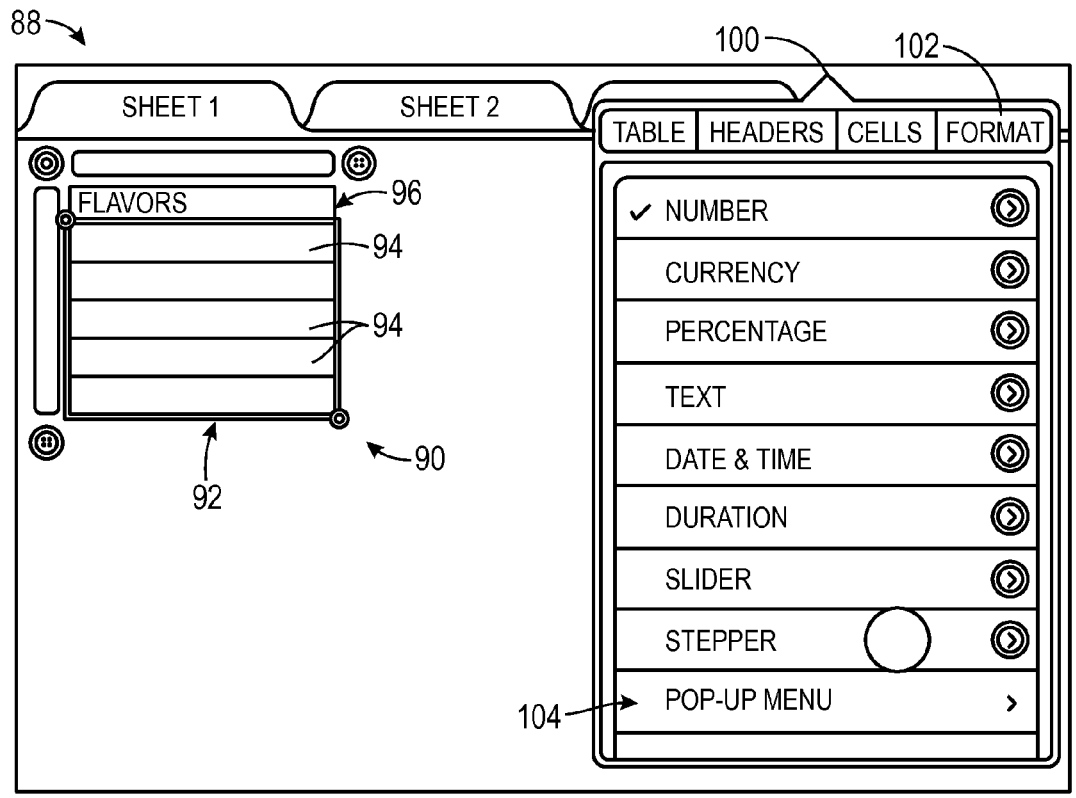
FIG. 4 depicts a screenshot of a formatting interface, in accordance with aspects of the present disclosure.
Figure 5:
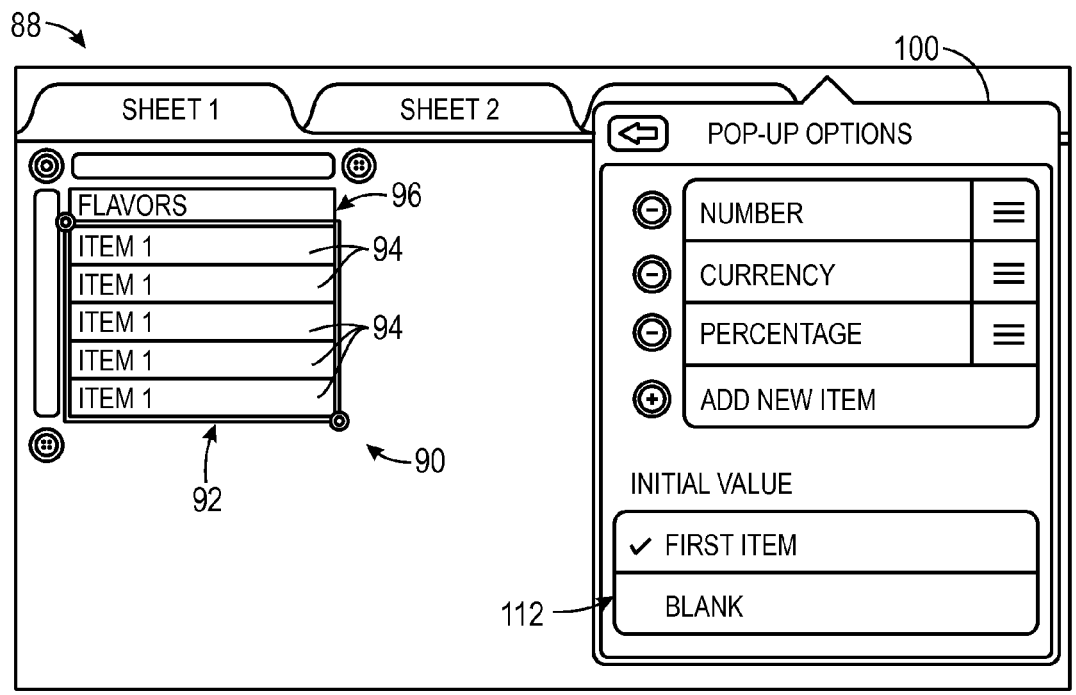
FIG. 5 depicts a screenshot of a pop-up generation interface, in accordance with aspects of the present disclosure.

By way of example, and relying on a series of representative screen-shots, FIGS. 4-10, depict screens and options that may be displayed as part of the present approach for generating pop-up menus, both manually and automatically. Turning to FIG. 4, in this example screen shot, a spreadsheet application 88 is depicted in which a table 90 having a single column 92 of cells 94 is displayed. In this example, the column 92 is labeled with a header 96 that provides an indication or description related to the contents of the cells 94. Here, the header 96 is titled "Flavors" and conveys that the contents of the cells 94 will relate to various flavors that may be associated with an items or items to which the table 90 relates. As will be appreciated, the present example is provided to facilitate explanation by providing a straight-forward, understandable context. However, the contents of the cells 94 and the options provided by the pop-up menus discussed herein may, in practice, relate to any number of suitable qualitative or quantitative descriptors.

With this in mind, and turning back to the example of FIG. 4, in this example the range of cells 94 is initially empty and the user may wish to associate the selected range of cells 94 with an option to populate the cells 94 via a pop-up menu. In one embodiment, the user may select the range of cells 94 and invoke, by appropriate means within the application spreadsheet program interface, an option to associate the selected cells 94 with a pop-up menu. For example, an information or setup menu 100 may be invoked after selecting the cells 94 and a format option (i.e., format option 102) may be selected allowing a user to apply certain format options to the selected cells 94. In the depicted example, the format options displayed include an option 104 to associate a control in the form of a pop-up menu with the selected cells 94.

Upon selection of the pop-up menu option 104, an options screen 110 may be displayed (FIG. 5) to allow configuration or modification of a pop-up menu to be associated with the selected cells 94. In the depicted example, the range of cells 94 is initially empty. In one implementation, the default initial value setting in the selected cells 94 is to the first option item (i.e., "Item 1") of the pop-up menu item list and the default character string, "Item 1", is initially displayed in the cells 94 of the selected range of cells 94 associated with the pop-up menu. In this example, other default values (i.e., "Item 2" and "Item 3") may also be associated with the pop-up menu being formatted, though the number of items associated with the default pop-up menu and the associated character strings may vary in different implementations. In the depicted example, the user is also provided with an option 112 to leave each selected cell 94 blank initially, as opposed to a default of initially populating the selected cells 94 with the first value within the pop-up menu option list being formatted. In addition, such a "Blank" initial value option may be employed to provide a user-selectable blank-option (e.g., an option for "none" or "blank") within the pop-up menu list being created (such as at the top of the pop-up menu) so that a user can actually select to leave the contents of a cell 94 that is linked to a pop-up menu blank or empty.

Figure 6:
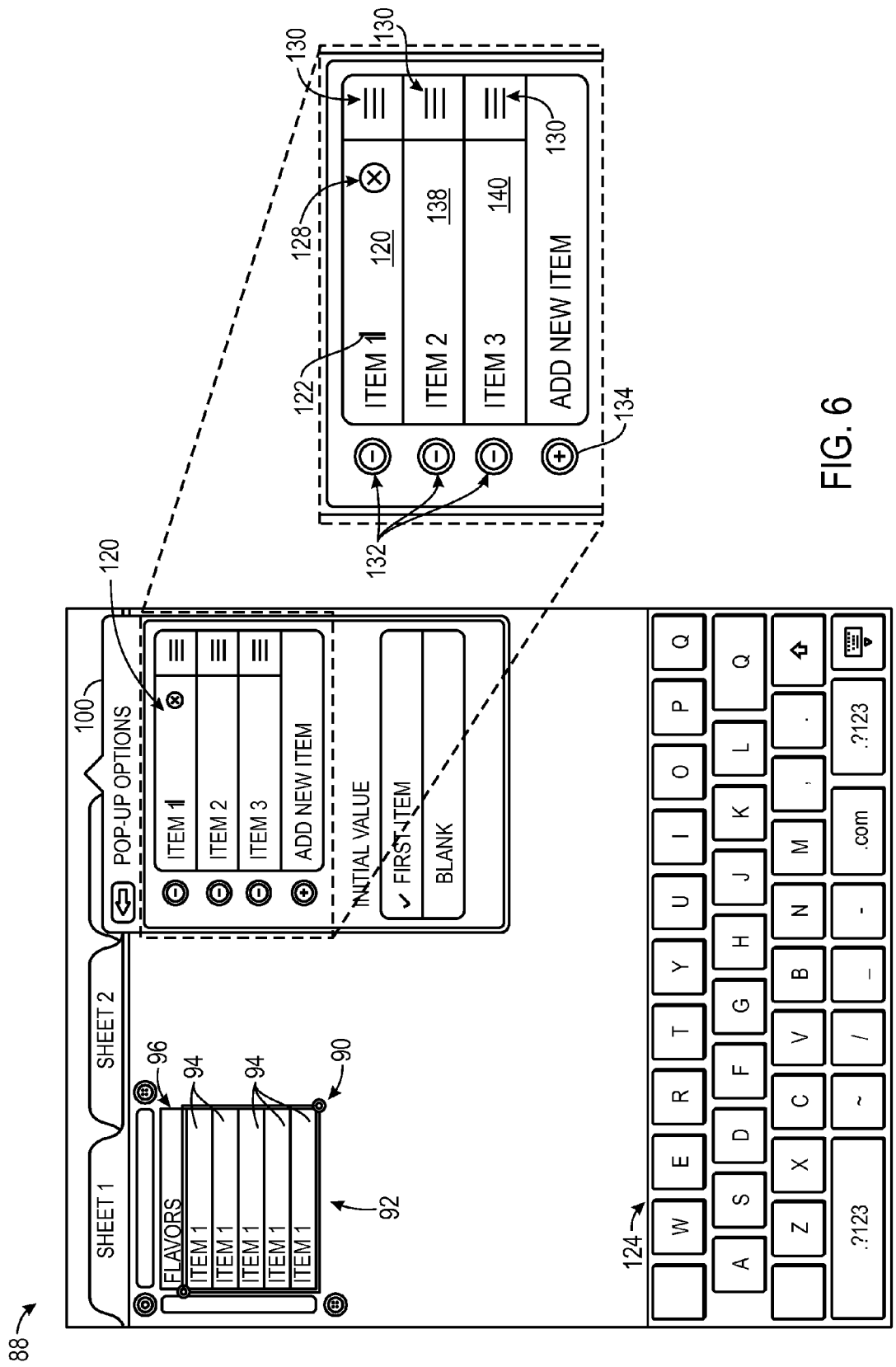
FIG. 6 depicts a screenshot of an operation whereby a pop-up menu list option is entered or edited, in accordance with aspects of the present disclosure.

Turning to FIG. 6, in this example the user may select (such as by touch in a touch screen context or mouse click in other contexts) the first option field 120 in the displayed pop-up menu options 110 to prompt entry of a value for the first option. In the depicted example, selection of the first option field 120 causes an insertion point 122 to be displayed in the first option field 120 along with a virtual keyboard 124, such as may be suitable for entry of a character string in a touch screen implementation. In one implementation, a control 128 that may be used to delete the current text in the first option field 120 may also be provided to allow a user to quickly and easily remove text present in the respective fields prior to entering new characters. In addition, controls 130 may be provided for reordering items of the pop-up menu, for deleting (controls 132) items from the pop-up menu, or for adding (control 134) new items to the pop-up menu. In certain implementations, deletion of an item from the pop-up menu list, such as using control 312, results in any cell 94 having a value corresponding to the deleted item to be set to the initial value (e.g., blank or to the first item in the pop-up menu list).

Figure 7:
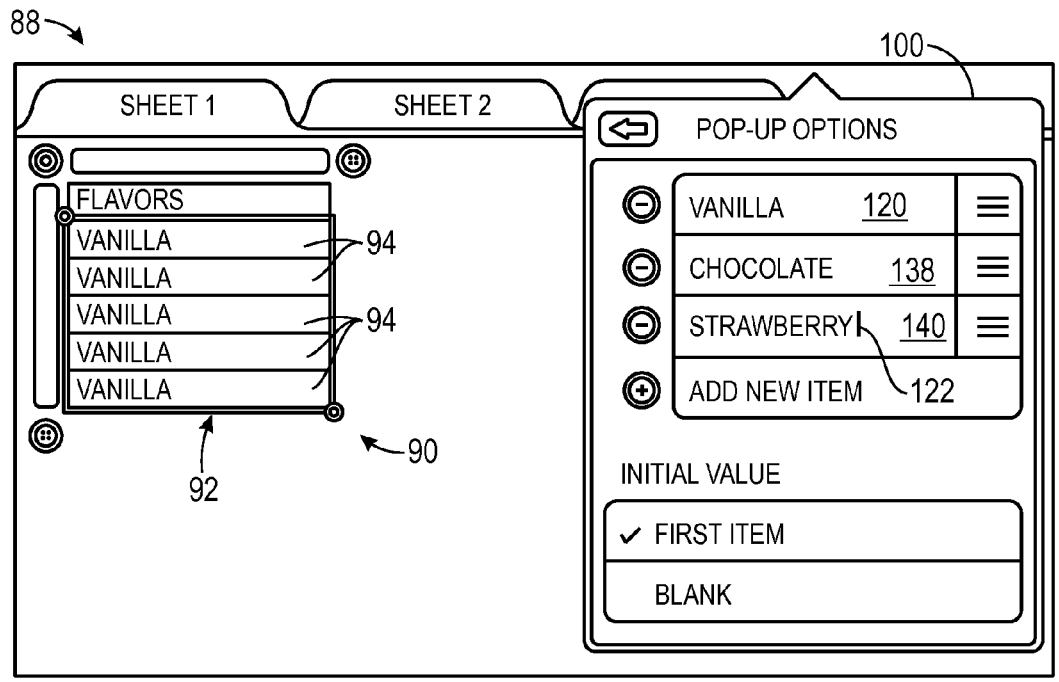
FIG. 7 depicts a screenshot of a list of option entered in a pop-up menu generation interface and a corresponding set of selected cells, in accordance with aspects of the present disclosure.

Using the virtual keyboard 124 or other suitable input interfaces, a user may enter a character string into the respective first option field 120 as well as second and third option fields 138, 140. Turning to FIG. 7, in the depicted example the user has entered the flavor "Vanilla" in the first option field 120, "Chocolate" in the second option field 138, and "Strawberry" in the third option field 140, thereby defining the values for the first three fields of a pop-up menu to populate the associated cells 94. In the depicted example, the user has also left the option selected to set initial values of the cells 94 to the first value in the pop-up menu. As a result, the cells 94 all initially display the character string "Vanilla" which is designated in the first option field 120.

Figure 8:
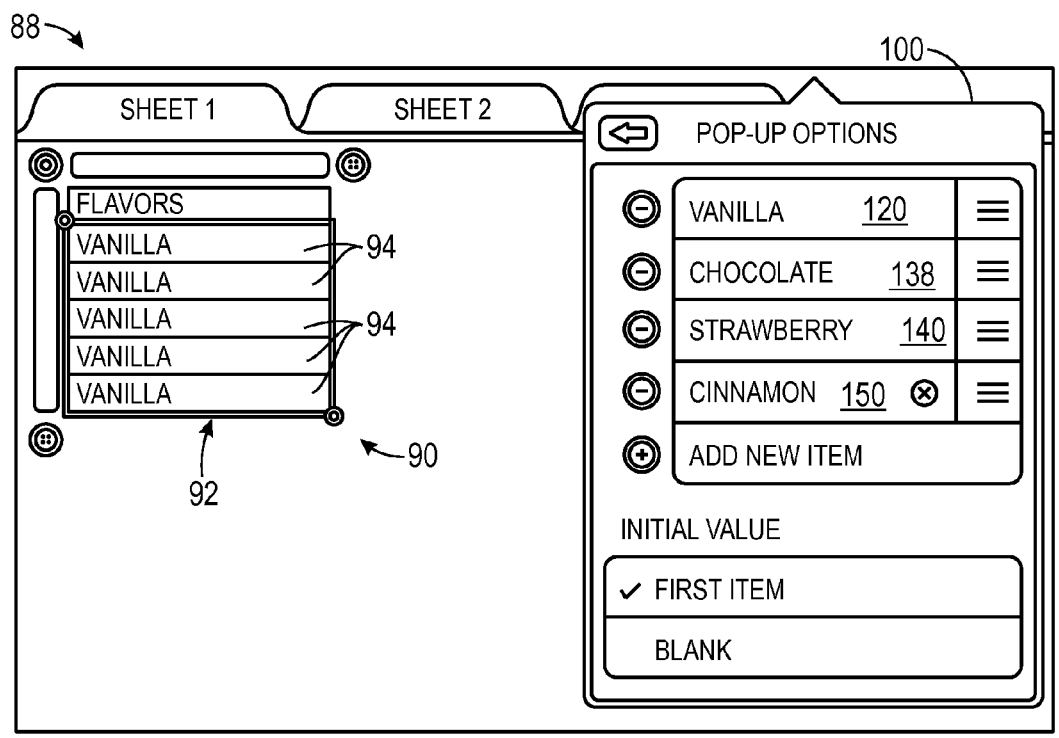
FIG. 8 depicts a screenshot of an operation whereby a pop-up menu list option is added, in accordance with aspects of the present disclosure.
Figure 9:
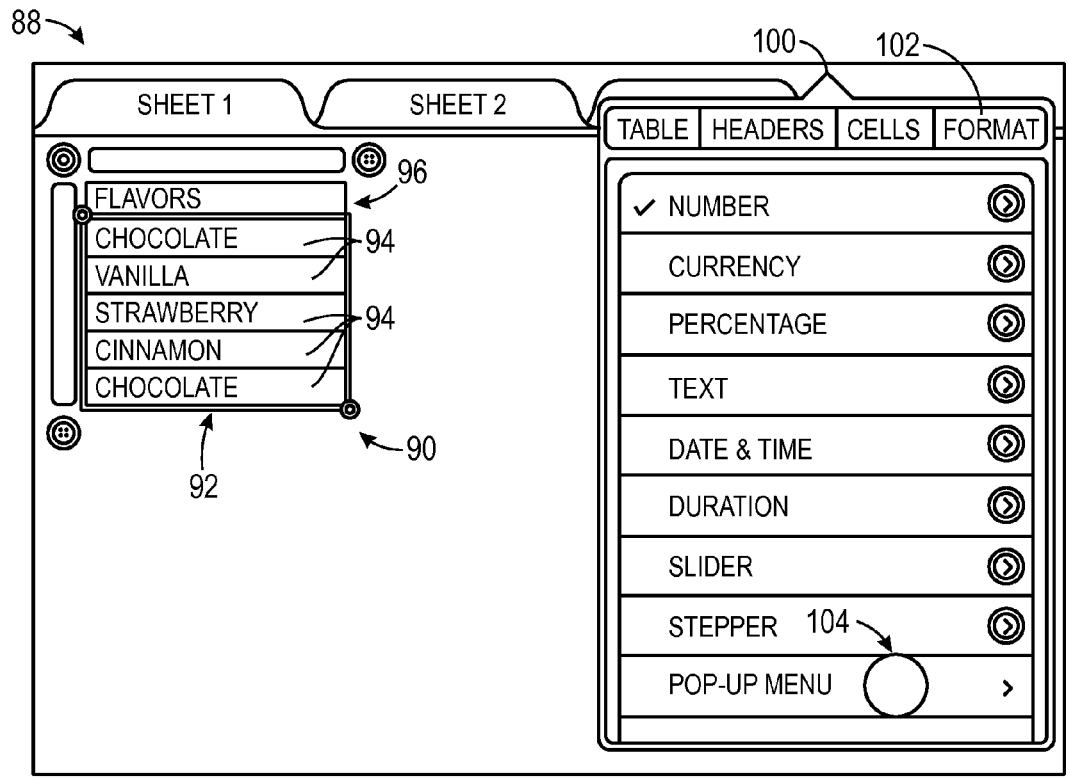
FIG. 9 depicts a screenshot of a formatting interface for generating a pop-up menu using a set of populated cells, in accordance with aspects of the present disclosure.
Figure 10:
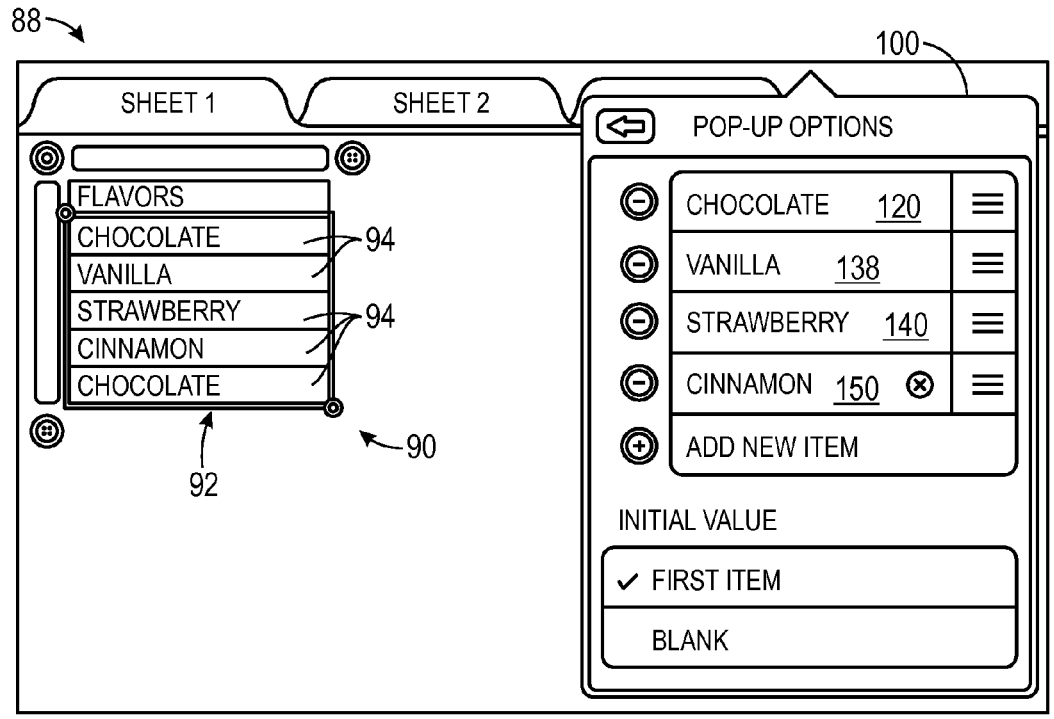
FIG. 10 depicts a screenshot of a pop-up generation interface populated using a set of selected cells, in accordance with aspects of the present disclosure.

Turning to FIG. 8, in this example, a user has added an additional field 150 to the pop-up menu options, such as by selection of the control 134 or corresponding "add new item" field or by interacting with a suitable key off the virtual keyboard 124 (such as a "Next" key) to add the additional field 150. In addition, FIG. 8 depicts the additional field 150 as having the character string "Cinnamon" entered in the added field 150 for display and use with a pop-up menu corresponding to the entered options.

Similarly, a user may rename an item in the pop-up menu list by selecting the field having the item to be renamed. Using virtual keyboard 124 or other suitable control (e.g., text removal control 128), the user may remove or overwrite the existing entry of the selected field and replace the prior entry with a new entry. In one implementation, upon entry and confirmation of the new entry in the pop-up menu list, any cells 94 that previously displayed contents corresponding to the changed entry may be updated to display the newly entered value or character string.

In certain instances, data entered into or edited in a field of the pop-up menu editing interface 110 may be determined to correspond to a particular non-text format, such as a time or data format, a currency format, or a number or duration format. In certain implementations, such a determination may result in the entered or edited character string being automatically converted (i.e., coerced) into that format upon completion of the entry or editing operation. In such implementations the formatted string, upon selection and entry into a cell 94 may be used in calculations or formulas referencing the respective cell 94. Such coercion or reformatting may also be automatically applied in certain instances where a text string (e.g., "five") is automatically reformatted into a numeric value or format (i.e., "5") from the text string. Alternatively, if the formatting so specifies, a numeric value may be reformatted to a text value upon entry into the pop-up menu option interface 110.

While the preceding discussion describes an implementation in which a pop-up menu is populated manually upon selection of a range of cells 94 that are empty, in other implementations the pop-up menu may be completely or partially populated based upon the existing entries of the selected cells 94. For example, turning to FIG. 9, the selected cells 94 may initially be populated with values used to generate a pop-up menu, which may then be used in populating additional cells.

In this example, the user may select the range of cells 94 having the suitable values and invoke, by appropriate means within the application spreadsheet program interface, an option to associate the selected cells 94 with a pop-up menu. For example, as discussed above, an information or setup menu 100 may be invoked after selecting the cells 94 and a format option (i.e., format option 102) may be selected from among a series of options to allow a user to apply certain format options to the selected cells 94. In the depicted example, the format options displayed include an option 104 to associate a control in the form of a pop-up menu with the selected cells 94.

Upon selection of the pop-up menu option 104, the pop-up menu options interface 110 may be displayed (FIG. 10) to allow configuration or modification of a pop-up menu to be associated with the selected cells 94. However, unlike preceding examples, the invoked pop-up menu option interface may be automatically populated based upon the contents (e.g., unique values) already present in the selected cells 94. In the depicted example, the order in which options are listed in the pop-up menu option interface 110 are based on the order in which the values occur in the selected calls 94. However, in other embodiments this may vary. For example, in an alternative embodiment, the frequency at which a value occurs in the selected cells 94 may instead determine the order in which the values are listed in the pop-up menu (i.e., more common or frequent entries are listed higher in the pop-up menu options). In the present example, duplicate values in the selected cells 94 are not added to the pop-up menu list, i.e., each unique value is only added once to the pop-up menu list. Further, in certain implementations, a cell 94 may have already been populated by means of a pop-up menu previously associated with the respective cell. In certain such embodiments, the present value within the selected cell may be used in populating the pop-up menu list within the pop-up options interface 110. In one embodiment where a pop-up menu list is initially populated using a set of populated cells 94, the selected cells 94, which become associated with the pop-up menu being generated, are assigned the value from the pop-up menu that corresponds to the respective cell's initial value. Such an implementation is in contrast to other implementations, where existing entries or contents of the selected cells are deleted or replaced with one or more stock options.

It should also be noted that, in certain circumstances, the content of a selected cell 94 may contain or be specified by a construct (e.g., a formula) or other content specifying mechanism (such as a stepper or slider mechanism also used in entering bounded values). Likewise, the content of a selected cell may be some non-text construct, such as a checkbox or star rating mechanism. In such instances, the control logic used to automatically generate the pop-up menu list may account for such values or value formats. For example, in one implementation, if a selected cell 94 contains a valid formula, the result of the formula (i.e., the displayed value in the cell) may be converted to a text or numeric string and added to the pop-up menu list as a selectable item, with that value being used as the content of the respective cell that contained the formula. Conversely, if the selected cell contains an invalid formula (such as due to an error in the formula), no value may be added to the pop-up menu list options and the respective cell may be initially populated with the first listed item in the pop-up menu or by a blank.

Likewise, numbers, dates, times, durations, custom formats, numeral systems, cell values specified by a slide, and cell values specified by a stepper may be converted to a suitable text string (or suitably formatted field) and the respective converted text string or formatted value used to populate the pop-up menu list options as well as the respective cell 94. Further, checkbox values present in a selected cell 94 may be converted into "true" or "false" text strings, respectively, corresponding to their logical values. Likewise, star-rating values present in a selected cell may be converted into a corresponding numerical text string (e.g., "**" may be converted to "4" or "four"). As described above, the content value in each selected cell 94** is automatically set to the item in the pop-up menu list options that corresponds to the cell's previous value.

Figure 11:
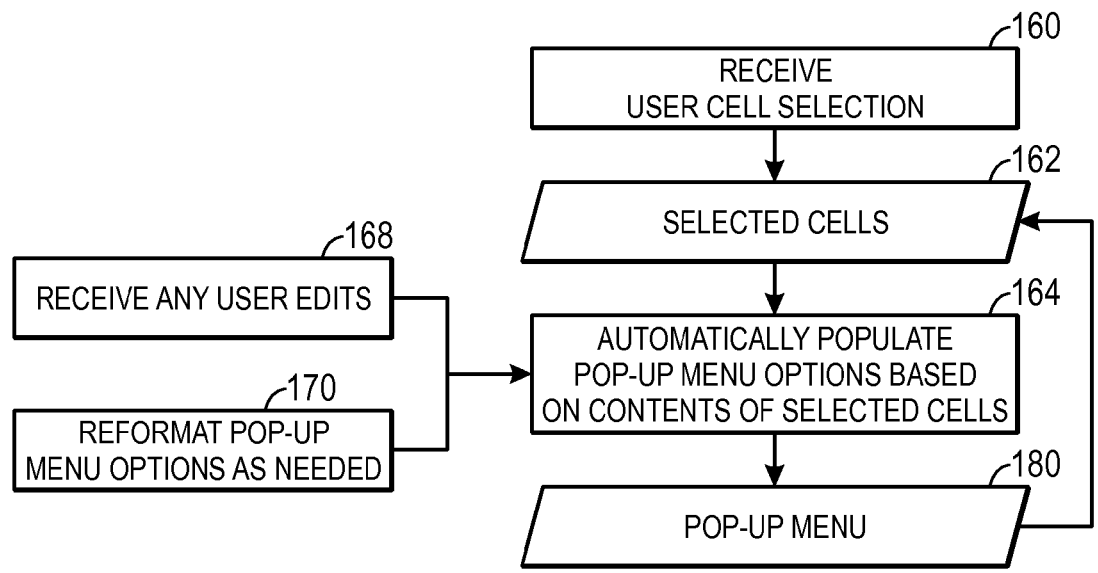
FIG. 11 depicts a process flow diagram of actions taken in generating a pop-up menu, in accordance with aspects of the present disclosure.

With the preceding discussion in mind, FIG. 11 depicts a process flow diagram illustrating control logic that may be used in one implementation in which a pop-up menu 180 is automatically generated based on a selection of populated cells 162. In this example, a suitable application, such as a spreadsheet application or other productivity application running on an electronic device 8, receives (block 160) a user input corresponding to a selection of cells 162, such as populated cells within a displayed table.

Based on the selected cells 162, a pop-up menu 180 may be automatically populated (block 164) based on the contents of the selected cells 162. For example, each unique value in the selected cells 162 may be listed once as an item or option in the pop-up menu list (i.e., values that are duplicated in the selected cells 162 are only listed once in the pop-up menu). In addition, user edits may be received (block 168), such as deletion or renaming of items or options from the generated pop-up menu. Likewise, various edits or reformatting logic in place may automatically convert or reformat (block 170)

values present in the selected cells 162 to a suitable text (or other) format in the pop-up menu options. Upon acceptance of the pop-up menu options, the pop-up menu 180 is associated with the selected cells and may be used to select or change the contents of the selected cells 162 or other cells with which the pop-up menu 180 is subsequently associated. Further, if a range of selected cells includes an existing pop-up cell, the currently-selected item or value may be assigned as the value for the respective cell. Further, to the extent that the reformatting step (block 170) or user editing step (block 168) results in a pop-up menu option being changed compared to the initial value in the cell contents from which it was derived, the content of those cells may be set to correspond to the edited or reformatted entry in the pop-up menu 180.

The preceding examples relate to instances where the pop-up menu list is initially generated and populated based on a range of cells that is entirely blank or entirely populated. As will be appreciated, in other circumstances, the selected range of cells 94 associated with a pop-up menu being generated may be partially populated, with some cells 94 being blank and others being populated with numeric or textual strings. In such instances, the pop-up list menu may generally be generated in the manner discussed above for generating a pop-up list menu from a range of populated cells except, in one implementation, the initial value setting 112 may be set to "Blank", or some similar setting. Based on this setting, the pop-up list menu generated in such an implementation will include a "Blank" option within the pop-up menu generated, such as in the first field option of the corresponding pop-up menu. As with the preceding example, the selected cells 94, which become associated with the pop-up menu being generated, are assigned the value from the pop-up menu that corresponds to the respective cell's initial value, including blank values.

Figure 12:
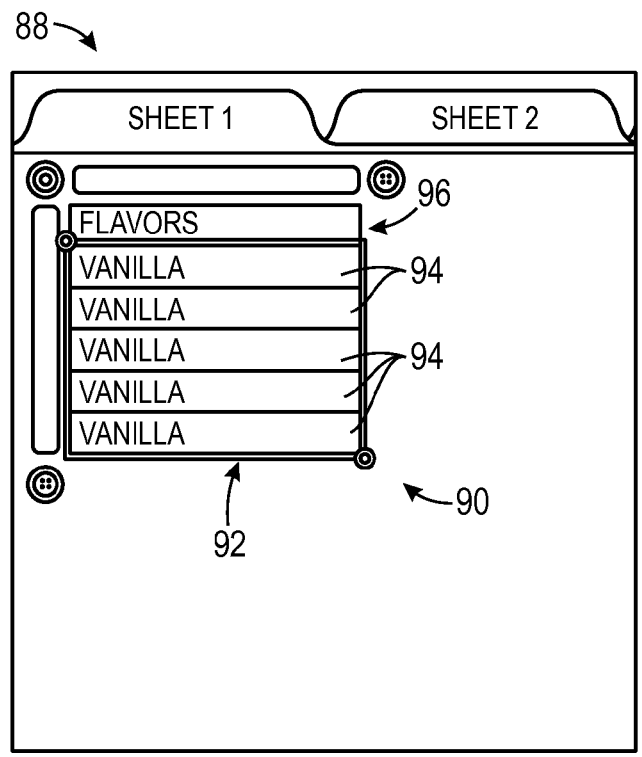
FIG. 12 depicts a screen shot of a set of cells associated with a pop-up menu, in accordance with aspects of the present disclosure.

The preceding discussion generally relates to the generation and modification of a pop-up menu for use in providing a bounded range of content option for associated cells of a table. The use of pop-up menus is now described. For example, turning to FIG. 12, a range of cells 94 of a table 90 is depicted where the cells 94 are associated with a pop-up menu. In the depicted example, the first list item in the pop-up menu (e.g., "Vanilla") initially populates the associated cells 94.

Figure 13:
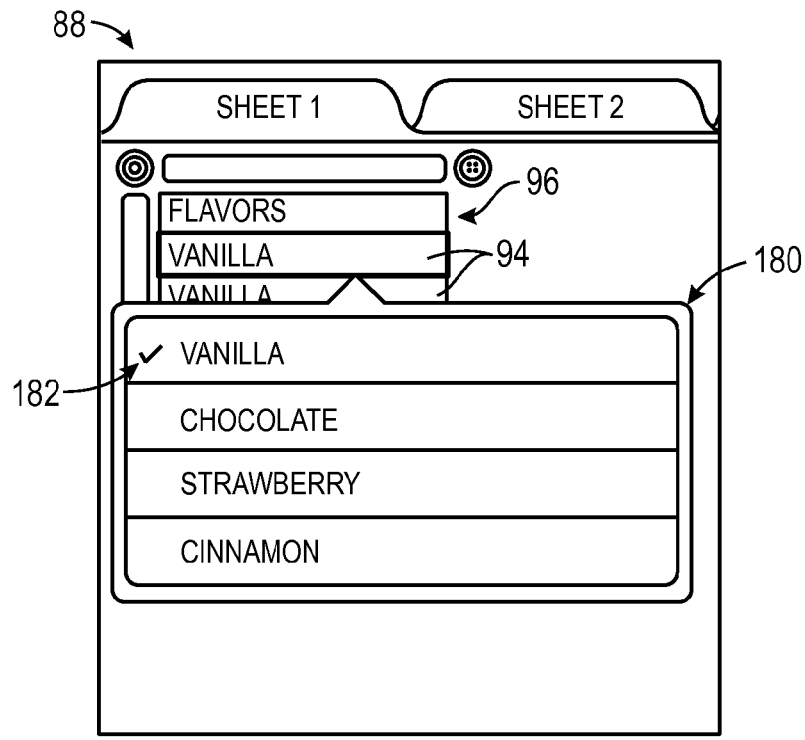
FIG. 13 depicts a screen shot of a pop-up menu displayed upon selection of a cell, in accordance with aspects of the present disclosure.

In this example, selection of a cell 94 associated with the pop-up menu (such as by single- or double-tapping the cell 94 in a touch screen embodiment) causes the pop-up menu or control 180 to be displayed (FIG. 13). In the depicted example, a carat or pointer of the pop-up menu 180 indicates the cell 94 for which the contents are to be selected. In addition or alternatively, the selected cell may be highlighted or otherwise visually indicated. To the extent that the length of the list of items in the pop-up menu 180 allows, the height of the pop-up menu 180 may be scaled to display all items in the list. If this is infeasible due to the length of the list, the list of options shown in the pop-up menu 180 may instead allow a user to scroll through or otherwise navigate the list of items. In the depicted example, the pop-up menu 180, when invoked for a given cell 94, initially indicates what selection in the pop-up menu 180 is already displayed as the content of the selected cell 94, such as via a visual indicator 182 (e.g., a check mark, highlighting, text color, and so forth).

Figure 14:
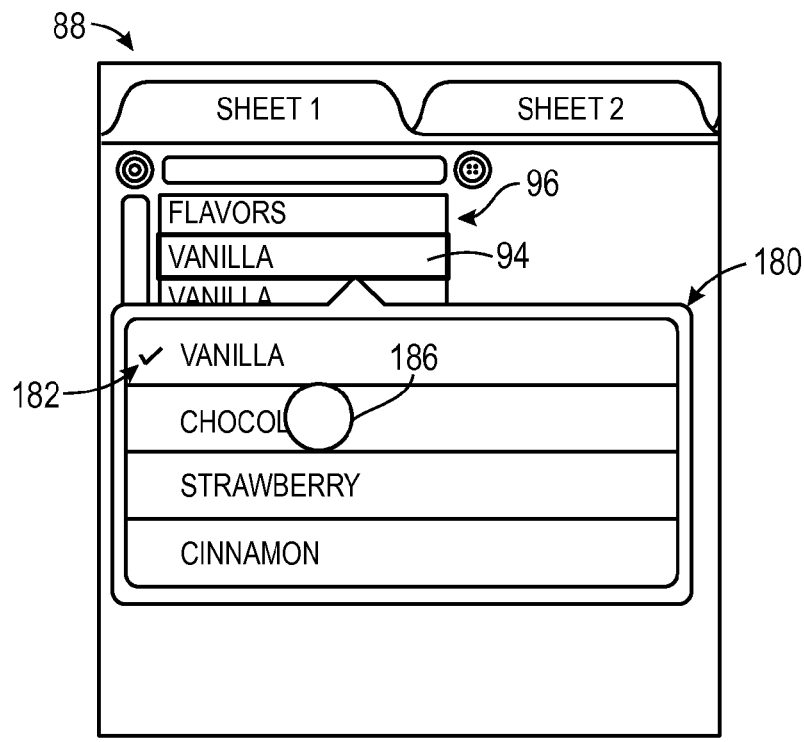
FIG. 14 depicts a user interaction with the pop-up menu of FIG. 13, in accordance with aspects of the present disclosure.
Figure 15:
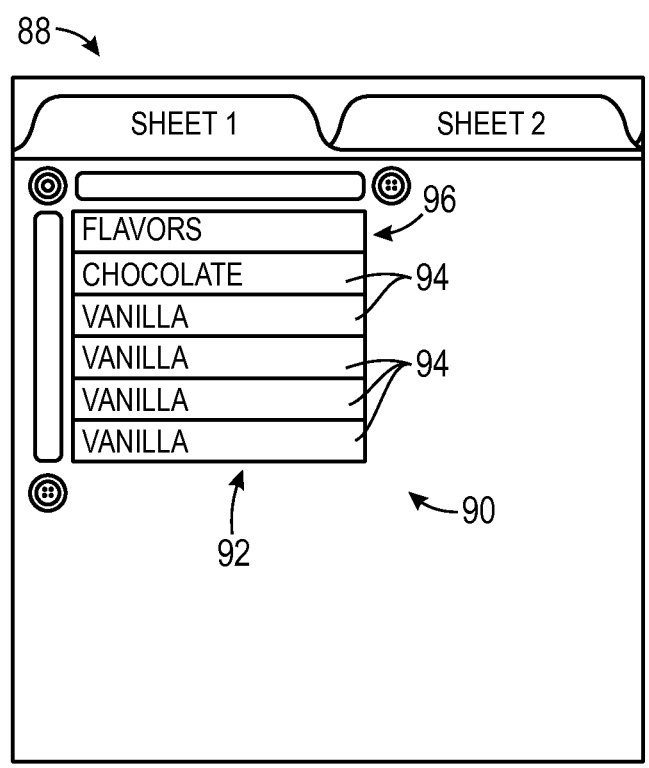
FIG. 15 depicts a screen shot of the selected cells of FIG. 12 after user selection of an option from the pop-up menu of FIG. 13, in accordance with aspects of the present disclosure.

Turning to FIG. 14, in this example, the user selects an option from the pop-up menu 180, such as indicated by contact point 186 of a touch-screen implementation. Upon selection of the different option in the pop-up menu 180, the content of the selected cell is updated to display the selected content and the pop-up menu 180 is removed from display, as depicted in FIG. 15. The user may then proceed to select other cells 94 and update the contents of these cells using the pop-up menu 180. While the preceding example relates to using a pop-up menu to select contents for a cell of a table or database, it should be appreciated that a pop-up menu as described herein may also be used to enter data into a form that may be constructed to facilitate entry into an underlying spreadsheet or database. That is, the field selected by a user and prompting display and use of a pop-up menu 180 may be displayed as part of a form that may in turn be constructed as an interface for entering data into an underlying spreadsheet or database.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for automatically generating a pop-up menu, the method comprising:
displaying, on a screen of an electronic device, a table comprising one or more cells, wherein at least one of the one or more cells is populated with content comprising a character string;
receiving a selection of the one or more cells populated with content;
receiving an instruction to create a menu listing allowable entries for the one or more cells, wherein the allowable entries include at least the content present in the selected cells; and
automatically creating the menu, wherein the menu comprises a list of selectable options, wherein one or more options of the list are based on the content present in the selected cells such that each unique instance of a character string of the content is provided as a respective option in the menu.

2. The method of claim 1, comprising:
displaying the menu when a respective cell of the one or more cells is selected;
receiving a selection of a respective option from the list; and
populating the respective cell with the respective option.

3. The method of claim 1, comprising:
reformatting one or more of the character strings when automatically creating the menu.

4. The method of claim 3, comprising:
replacing the one or more character strings in the one or more cells with the reformatted character strings present in the menu.

5. The method of claim 1, wherein at least one of the one or more cells is blank and wherein the automatically created menu comprises a selectable blank option.

6. The method of claim 5, comprising:
leaving the at least one of the one or more cells blank when automatically creating the menu.

7. The method of claim 1, comprising:
automatically populating the one or more cells with an initial value comprising one of:
a blank; or
a specified default option of the list.

8. The method of claim 7, wherein the specified default option is the first listed option of the list.

9. The method of claim 7, comprising:
displaying a selection between the blank and the specified default option; and
receiving a selection of the blank of the specified default option.

10. A processor-implemented method for automatically generating a pop-up menu, the method comprising:
receiving a selection of one or more cells of a table, wherein at least one of the one or more cells is populated with content in the form of respective character strings;
receiving an instruction to create a pop-up menu that lists options for populating the one or more cells;
automatically creating the pop-up menu based on the content of the populated cells, wherein each unique instance of a respective character string is represented once in the pop-up menu.

11. The processor-implemented method of claim 10, wherein automatically creating the pop-up menu comprises reformatting at least one character string to one of a data format, a time format, a number format, a currency format, a duration format, or a text format.

12. The processor-implemented method of claim 10, wherein automatically creating the pop-up menu comprises reformatting an output of a valid formula and providing the output as an option in the pop-up menu.

13. The processor-implemented method of claim 10, comprising:
receiving an edit or an automatic reformat of a respective character string present in the one or more cells;
providing the edited or reformatted respective character string as an option in the pop-up menu in place of the respective character string; and
repopulating the respective cells initially containing the respective character string with the edited or reformatted character string present in the pop-up menu.

14. The processor-implemented method of claim 10, wherein, upon creation of the pop-up menu, each of the one or more selected cells displays a value present in the cell when the pop-up menu was created or a corresponding edited or reformatted value as it appears in the pop-up menu options.

15. A processor-based system, comprising:
a display;
a memory storing one or more routines; and
a processing component configured to execute the one or more routines stored in the memory, wherein the one or more routines, when executed by the processing component, cause acts to be performed comprising:
displaying a table comprising a plurality of cells;
receiving a first input selecting one or more of the plurality of cells, wherein at least one of the selected cells contains displayed character content;
receiving a second input formatting the one or more selected cells to be populated by a pop-up menu;
creating the pop-up menu based at least in part on the displayed character content such that each unique character content is provided as a respective option in the pop-up menu.

16. The processor-based system of claim 15, wherein at least one of the selected cells is blank and wherein the created pop-up menu includes a blank option.

17. The processor-based system of claim 15, wherein the order in which the respective options are listed in the pop-up menu corresponds to the order in which displayed character content occurs in the one or more selected cells.

18. The processor-based system of claim 15, wherein creating the pop-up menu comprises reformatting one or more of the character content to correspond to a data format determined to be suitable for the respective character content.

19. The processor-based system of claim 15, wherein creating the pop-up menu comprises receiving one or more edits to the character content provided as respective options in the pop-up menu.

20. A non-transitory, computer-readable medium storing one or more instructions executable by a processor of an electronic device, the instructions, when executed, performing acts comprising:
automatically creating a menu of options for populating a selected set of cells of a table, wherein the menu of options is initially created based on the contents of the selected set of cells such that each unique character string instance within the selected cells is provided as a respective option in the menu;
reformatting one or more of the options in the menu to a different data format if the respective option is determined to correspond to a different data type;
processing any edits of the one or more options if edits are provided;
displaying the selected set of cells of the table, wherein each selected cell is displayed having contents corresponding to an option that corresponds to: an initial value present in the selected cell when the menu was generated, a reformatted value derived from the initial value, or an edited value derived from the initial value.

21. The non-transitory, computer-readable medium of claim 20, further comprising instructions, which when executed, perform acts comprising:
displaying the menu when one of the selected set of cells is picked;
receiving a selection of a selected option from the menu; and
displaying the selected option in the respective picked cell.

22. The non-transitory, computer-readable medium of claim 20, further comprising instructions, which when executed, perform acts comprising:
receiving an instruction specifying the selected set of cells to initially display one of a blank or a specified option from the menu.

23. The non-transitory, computer-readable medium of claim 22, wherein the specified option comprises a first listed option.

24. The non-transitory, computer-readable medium of claim 20, wherein the menu of options includes a blank option.

* * * * *